(12) United States Patent
Van Gestel

(10) Patent No.: US 7,526,000 B2
(45) Date of Patent: Apr. 28, 2009

(54) JITTER COMPENSATION METHOD FOR SYSTEMS HAVING WALL CLOCKS

(75) Inventor: Wilhelmus Jacobus Van Gestel, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 540 days.

(21) Appl. No.: 10/521,255

(22) PCT Filed: Jul. 4, 2003

(86) PCT No.: PCT/IB03/02992

§ 371 (c)(1),
(2), (4) Date: Jan. 13, 2005

(87) PCT Pub. No.: WO2004/010670

PCT Pub. Date: Jan. 29, 2004

(65) Prior Publication Data

US 2005/0237937 A1   Oct. 27, 2005

(30) Foreign Application Priority Data

Jul. 19, 2002   (EP)   ................................. 02077952

(51) Int. Cl.
*H04J 3/06* (2006.01)
(52) U.S. Cl. ................... 370/516; 370/417; 370/519
(58) Field of Classification Search ................. None
See application file for complete search history.

(56) References Cited

U.S. PATENT DOCUMENTS 5,742,623 A * 4/1998 Nuber et al. ............... 714/798
5,781,599 A * 7/1998 Shiga ......................... 375/376
6,259,694 B1   7/2001 Sato et al.
2004/0153716 A1* 8/2004 Baker ........................... 714/4

FOREIGN PATENT DOCUMENTS

| EP | 0987894 A2 | 3/2000 |
| EP | 0987894 A3 | 4/2000 |
| EP | 0987894 B1 | 3/2004 |

OTHER PUBLICATIONS

Laoutaris, N et.al; Intrastream Synchronization for Continuous Media Streams: A Survey of Playout Schedulers; Magazine; May 2002; vol. 16, No. 3; pp. 1-12.
Bin Yu, et.al.; Softlink: Realtime Software HD Stream filtering for QoS control; Dec. 2001; pp. 1-17; University of IL USA.
Liu; Extension of RTP payload Type for Multiple Program MPEG Transport Stream; Oct. 1999; paragraph 3, A. Four. Layer. Model; figure 1.

* cited by examiner

*Primary Examiner*—Duc C Ho

(57) ABSTRACT

Jitter is compensated on data packets by clock time derived time stamping upon transmission of the data packets. This results in transmission time stamps. The jitter is compensated based on a comparison between the transmission time stamps and generated reception time stamps of the data packets, whereby the reception time stamps are derived from the same clock time as whereof the transmission time stamps are derived. The comparison provides time delay information which is used for calculating a required minimum and maximum buffer size, for absorbing the practically experienced jitter at the receiver end of the transmission medium. The method is also suited for real time applications, such as MPEG, DVB and DSS.

15 Claims, 2 Drawing Sheets

JITTER COMPENSATION METHOD FOR SYSTEMS HAVING WALL CLOCKS

Figure 1:
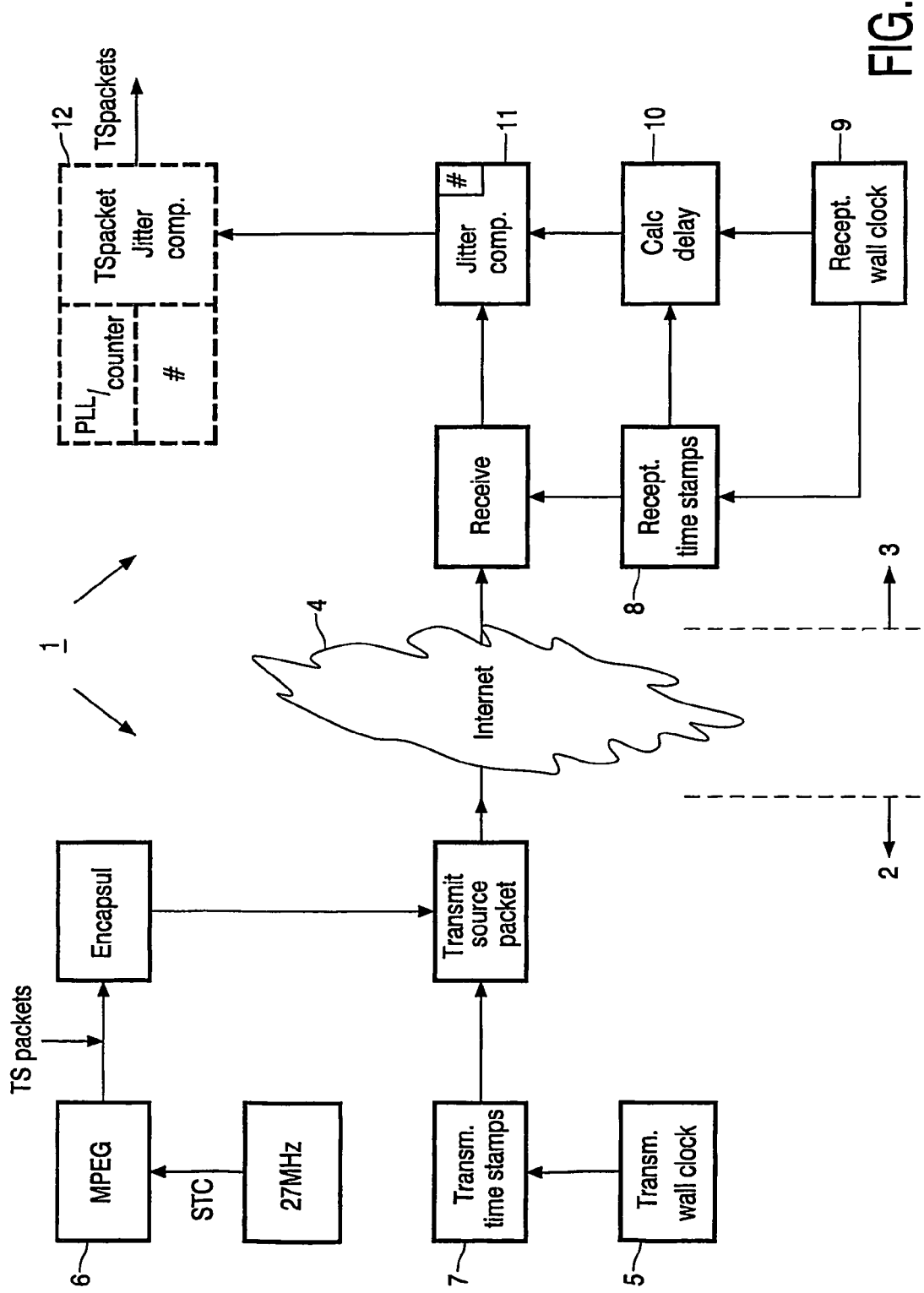

The present invention relates to a method for compensating jitter on data packets by clock time derived time stamping upon transmission of the data packets resulting in transmission time stamps.

The present invention also relates to a transmission system comprising a transmitter and a receiver mutually coupled through a transmission medium, the transmitter comprising a transmitter wall clock and transmission time stamping means coupled to the transmitter wall clock for time stamping the data packets upon their transmission to the receiver, and to a transmitter, to a receiver and to signals used in the above mentioned transmission system, which is suited for applying the above method.

Such a method and transmission system are known from U.S. Pat. No. 6,259,694 B1. In the known method a source packet is used, in for example a Digital Video Broadcast (DVB) system, which source packet includes a 4 byte source packet header and 188 bytes of transport stream data In the source packet header 25 bits represent time stamps utilized for suppressing jitter when for example Moving Picture Experts Group-Transport Stream (MPEG-TS) data is transmitted by means of isochronous packet (IP) communication through a transmission medium to a receiver. The receiver comprises a storage device, such as a First In First Out (FIFO) buffer memory for storing received data packets. The buffer memory must have such a size that it is capable of absorbing jitter on the received data packets, which is introduced by the transmission medium.

It is a disadvantage that if the jitter is high the buffer size in the receiver increases substantially, in order to secure a reliable data transmission.

It is an object of the present invention to provide an improved method and transmission system for compensating jitter, which works well even if the received data is subjected to substantial and varying jitter, without however requiring a large buffer size.

Thereto the method according to the invention is characterized in that the jitter is compensated based on a comparison between the transmission time stamps and generated reception time stamps of the data packets, and that the reception time stamps are derived from the same clock time as whereof the transmission time stamps are derived.

Similarly the transmission system according to the invention is characterized in that the receiver comprises a receiver wall clock which is similar to the transmitter wall clock, a reception time stamping means coupled to the receiver wall clock for generating time stamps upon reception of the data packets, and jitter compensating means coupled to the reception time stamping means for compensating jitter on the data packets.

Due to the fact that the same clock time in the so called wall clock or the same mutually related clock time values are used for deriving the transmission time stamps and the reception time stamps, a meaningful comparison can be made to provide reliable information about the jitter actually experienced after transmission of the data packets to the receiver. The thus provided time delay information provides a basis for calculating a required minimum and maximum buffer size, for absorbing the practically experienced jitter at the receiver end in the transmission medium.

Even in case of Internet Protocol communication of data packets, as one possible form of Isochronous Protocol (IP) communication over a communication medium, like the Internet, which is very rich on jitter and in particular varying jitter, the buffer size can be optimally tailored to the expected jitter to be compensated. Effective and reliable jitter compensated IP data communication for real time applications is now practically feasible, while given the jitter limits, the receiver buffer size can advantageously be minimized.

It is a further advantage of the method and transmission system according to the invention that several available types of real-time application can be applied, irrespective whether or not individual application protocols are fully developed or not. Examples of such real-time applications are: MPEG 1-2 TS packets over IP, or Digital Video (DV) packets, IEC 958 digital audio packets or Digital Satellite System (DSS) packets over IP.

An embodiment of the method according to the invention is characterized in that the data packets are isochronous packets containing one or more transport stream packets.

Advantageously this embodiment provides a high time stamp efficiency, because there is only one transmission or reception time stamp for one IP packet, which IP packet may for example comprise 7 Transport Stream (TS) packets.

A further embodiment of the method according to the invention is characterized in that an additional jitter compensation mechanism is applied on the transport stream packets present in the IP packets.

Because the jitter on the TS packets may still be too high for some applications, such as for example MPEG, a remaining jitter of the individual TS packets within the IP packets is compensated further by means of the additional jitter compensation mechanism. Advantageously the earlier jitter compensation and the additional jitter compensation work on a different and mutually independent ISO communication layer.

A still further embodiment of the method according to the invention is characterized in that at least some of the transport stream packets comprise an associated time stamp which drives a phase locked loop in the additional jitter compensation mechanism.

It is an advantage that because the TS packets are embedded in the data or IP packets their jitter within each IP packet generally is limited, which means that this now opens the possibility of driving a PLL with the help of these associated time stamps for creating a stable oscillator frequency for reducing the jitter on the transport stream data packets, included in the IP packets.

A still further embodiment of the method according to the invention is characterized in that the associated time stamp is included in a PCR packet, which preferably is the first packet in an isochronous protocol packet.

Advantageously jitter on the PCR packet is small if the PCR packet is first packet in the IP packet. Consequently the PLL frequency will be very accurate.

Another embodiment of the method according to the invention is characterized in that the associated time stamps depend on the comparison between the transmission time stamps and generated reception time stamps of the data packets.

If the jitter of individual transport packets within the isochronous protocol packets is not limited, the accurate time delay which is the result of the time stamp comparison can be used to provide effective inter IP packet jitter compensation.

The transport stream packets may have a variable bit rate, which still means that within an IP packet the bit rate is fixed, but that the time between IP packets may be different. The transport stream packets may also comprise so called partial TS packets, which means that some TS packets are left out of the IP packet. However in all these cases the method according to the invention can still be applied, without requiring an excessive buffer size.

At present the jitter compensation method and transmission system according to the invention will be elucidated further together with their additional advantages, while reference is being made to the appended drawing, wherein similar components are being referred to by means of the same reference numerals.

Figure 2:
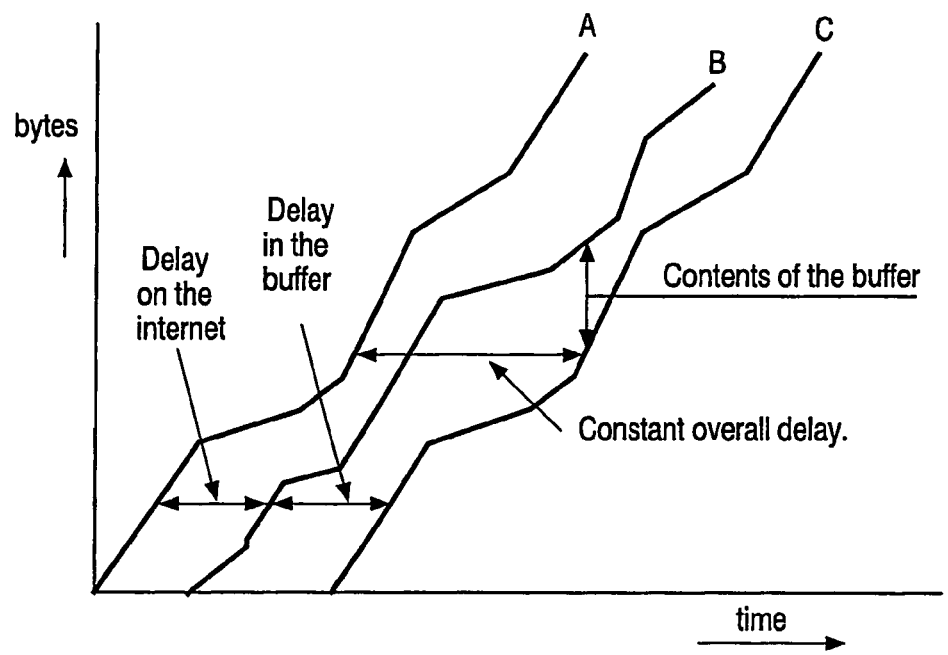
Figure 3:
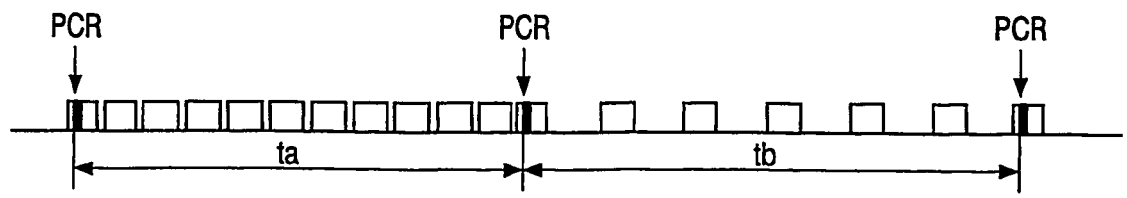

In the drawings:

FIG. 1 shows a block diagram including several possible embodiments of a transmission system according to the invention;

FIG. 2 a graph representing the amount of bytes communicated to a buffer memory used in a receiver for application in the transmission system if FIG. 1; and FIG. 3 shows MPEG transport stream packets having a variable bit rate for communication through the transmission system of FIG. 1.

FIG. 1 shows a transmission system 1 comprising a transmitter 2, and a receiver 3 interconnected through a so called packed switched network 4, such as for example the Internet. In such a network 4, data packets are transmitted independently from one another from the transmitter 2 through the network 4 to the receiver 3. Every data packet sent over the network 4 experiences a different delay before ending up in some receiver buffer, whereby even the order of the received packets may have been changed. For real-time applications this provides a problem, because at the receiver output the order of the packets has to be right and their mutual time delay should be within tight tolerances; for MPEG the maximum time tolerance is 500 nsec. Other examples of present real-time applications are: MPEG 1 or 2 Transport Stream (TS) packet communication, Digital Video Broadcast (DVB), IEC 958 digital audio packets or Digital Satellite System (DSS) packets over Internet and the like, whereby the last mentioned application forms do not yet have a protocol. In general real-time applications, such as related to Video-On-Demand are also getting more and more important. In order to cope with experienced transmission delays the receiver buffer size for achieving a reliable real-time transmission can be substantial. By using time stamping in both the transmitter 2 and receiver 3, which time stamping is based on a common clock 5, or transmitter/receiver wall clock which provides the same time all over the world, the transmission delay of every received data block is known in the receiver 3. This way the required receiver buffer size is known and can be minimized.

The transmitter 2 comprises a data-source 6 of for example an MPEG-2 Transport Stream consisting of MPEG-2 TS packets on a time base, which is derived from a generally 27 MHz clock or counter reference, here called System Time Clock (STC). An MPEG transport stream may consist of several programs, each containing audio, video and system transport stream packets. The transport stream packets from the audio, video or elementary system streams are multiplexed in the transport stream in such way that no buffer underflow or overflow occurs. It is important that the timing relation of the individual packets is kept, then it is guaranteed that no buffer underflow or overflow occurs.

When the MPEG Transport stream is transmitted over the interface, then the TS packets may be included in IP packets, whereby one or more, for example 7 TS packets are encapsulated in one IP packet to form a so called Real Time Protocol (RTP) type IP packet. If the maximum size of the IP packet is limited to 1500 bytes then a maximum of 7 TS packets can be packet in one IP packet.

In practice very often also a 4 byte application time stamp derived from the 27 MHz counter is added to a TS packet for creating a TS packet having the form of a so called source packet. This time stamp is used to compensate jitter on the individual packets.

Here the IP packet may be provided with a transmission time stamp from transmission time stamping means 7, coupled to the transmitter wall clock 5. The actual transmission time stamp may for example represent the moment whereon the first byte of the IP packet is delivered to the transmitter. The IP packets are now sent over the network 4 and upon receipt at the receiver 3 reception time stamping means 8 coupled to a receiver wall clock 9 provide reception time data to for example calculating means 10. The calculating means 10 calculate the time delay between transmission and reception of the IP packet, based on the receiver wall clock 9, which indicates a time which has the same basic time reference as the transmitter wall clock 5. The calculated time delay is used in jitter compensating means 11 to compensate for transmission jitter and generally accumulated delays—such as buffer delays—on the IP packets. The required size of the buffer, schematically indicated in means 11, is then equal to the maximum bit rate multiplied by the maximum delay of the IP packets.

The relation between the amounts of required buffer storage bytes at the receiver 3 over time is graphically represented in FIG. 2. From left to right the FIG. 2 shows: input to the transmitter 2, indicated 'A'; input to the receiver 3, indicated 'B'; and output from the receiver 3, indicated 'C'. Horizontally A minus C provides the instantaneous delay, while vertically the instantaneous buffer content can be found, which must be stored in the buffer in order to coop with the delay. If required minimum and maximum buffer sizes can be derived there from.

FIG. 3 shows examples of MPEG transport stream packets having a variable bit rate, which packets are suited for transmission through the system 1. Here each first TS packet contains one Program Clock Reference (PCR), which may be filled with time stamp data, corresponding to the STC and in particular the aforementioned transmission time stamp data. In this case the multiplexing of the transport stream packets is in such a way that the bit rate between two succeeding PCR packets is constant. This is a property of the so called 'Full' transport stream. After selecting one program of the transport stream the bit rate can be reduced by removing the non-used transport stream packets from the non-used programs. This way a partial transport stream is created. The bit rate on interfaces is reduced and the storage capacity, when storing a selected program, is also reduced. To avoid buffer problems in a decoder (underflow/overflow) it is needed to keep the same timing of the selected transport stream packets on the STC time base. Now the bit rate between two succeeding PCR packets is not constant anymore.

It is to be noted that not all IP packets have to be provided with a PCR packet. If for example the distance between succeeding Pars is less than 100 msec, often less than 40 msec, and at a bit rate of 2 Mbyte/sec, there are in the former case 200 Kbytes between the two Par's, this is about 1000 transport stream packets and then it is clear that not all IP packets do contain a PCR packet. It is shown in FIG. 2 that during period ta the bit rate is higher than during the period tb.

The system 1 may further comprise transport stream jitter compensating means 12, which are coupled to the jitter compensating means 11 in order to compensate jitter on TS packets present within the IP packets. The transport stream jitter compensating means 12 may include a Phase Locked Loop (PLL), apart from a required system buffer. The PLL may be locked on the input PCRs as associated time stamps for creating a stable and accurate oscillator frequency with the help whereof the jitter between TS data packets included in the IP packets can be reduced. Jitter on the PCR packet is small if the PCR packet is first packet in the IP packet, and then the PLL frequency will be very accurate.

For restoring a full transport stream at the receiver 3 all the data packets between two PCRs are stored in a system buffer. Then the packets are equally distributed over the interval between the two PCRs. For this method the buffer needs to be quite large, i.e. a few hundred Kbytes.

For restoring a partial transport stream jitter on the TS packets which carry the PCR is possible, but compensation of jitter on the other packets is not possible. A new partial transport stream is therefore derived which does not have buffer underflow or overflow. By simulating the contents of audio and video buffers a new compliant partial transport stream can be made, provided no overflow or underflow of the buffers concerned occur.

With a large jitter on the PCR packets the PLL or counter in the receiver 3 would encounter too much jitter and would not receive reliable synchronization data. It is for this case and for the case where it is avoided to create a new partial transport stream, that the 4 byte application time stamp is added to every TS packet, as is known in the art, in order to then specify an application dependent time.

In this alternative embodiment the PLL may be replaced by a counter which is set to the PCR in the MPEG transport stream. The time stamp in front of every transport stream packet is used to compensate jitter on the individual transport stream packets. This method is used for 'Full' as well as 'Partial' transport streams.

In a further alternative embodiment of the transmission system 1 the calculated time delay time defined by the transmission time stamp and the reception time stamp of the IP packet, can be used to set the PCR. In one IP packet timestamps from both the wall clock as well as the MPEG application are transmitted. By comparing the transmitted wall clock timestamp with the wall clock value at the receiver 3 it is known what delay occurs for this packet. Then it is also known what the value of the 27 MHz counter should be. This kind of packet is repeated at regular intervals to avoid drifting away from 27 MHz clock and wall clock. The other IP packets contain a 27 MHz time stamp together with a payload e.g. 7 transport stream packets. In case the transmitted transport stream packets do not contain an MPEG time stamp in front of the packet then, first the PCR packets are placed in the correct position of the STC time base. For restoring a full transport stream at the receiver 3 all the data packets between two PCRs are stored in a system buffer. Then the packets are equally distributed over the interval between the two PCRs. For this method the buffer needs to be quite large, i.e. a few hundred Kbytes.

For restoring a partial transport stream the jitter on the TS packets can not be compensated. Now a new partial transport stream is derived by simulating the contents of audio and video buffers. A new compliant partial transport stream is made, which does not provide overflow or underflow of the buffers. In case the transmitted transport stream packets comprise an MPEG time stamp in front of the packet then, jitter on every packet can be compensated by using this time stamp.

The invention claimed is:

1. A method wherein jitter on data packets is compensated by using clock time derived time stamping upon transmission of the data packets resulting in transmission time stamps, characterized in that the jitter is compensated based on a comparison between the transmission time stamps and generated reception time stamps, said transmission time stamps each being included in a Program Clock Reference (PCR) packet as a first packet in an isochronous protocol type data packet, and that the reception time stamps are derived from the same clock time from which the transmission time stamps are derived.

2. The method as claimed in claim 1, characterized in that the data packets are isochronous protocol packets containing one or more transport stream packets.

3. The method as claimed in claim 2, characterized in that an additional jitter compensation mechanism is applied on the transport stream packets present in the isochronous protocol packets.

4. The method as claimed in claim 3, characterized in that at least some of the transport stream packets comprise an associated time stamp which drives a phase locked loop (PLL) in the additional jitter compensation mechanism.

5. The method as claimed in claim 4, characterized in that the associated time stamp depend on the comparison between the transmission time stamps and generated reception time stamps of the data packets.

6. The method as claimed in claim 2, characterized in that the transport stream packets have a variable bit rate.

7. The method as claimed in claim 2, characterized in that the transport is a partial transport stream.

8. A transmission system wherein jitter on data packets is compensated by using clock time derived time stamping upon transmission of the data packets resulting in transmission time stamps, said transmission system comprising a transmitter and a receiver mutually coupled through a transmission medium, the transmitter comprising a transmitter wall clock and transmission time stamping means coupled to the transmitter wall clock for time stamping the data packets upon their transmission to the receiver thereby forming transmission time stamps, characterized in that the receiver comprises a receiver wall clock which is similar to the transmitter wall clock, a reception time stamping means coupled to the receiver wall clock for generating time stamps upon reception of the data packets, and jitter compensating means coupled to the reception time stamping means for compensating jitter on the data packets, wherein the transmission time stamp is included in a Program Clock Reference (PCR) packet as a first packet in an isochronous protocol type data packet, and wherein the reception time stamps are derived from the same clock time from which the transmission time stamps are derived.

9. The transmission system as claimed in claim 8, characterized in that the data packets are isochronous protocol packets containing one or more transport stream packets.

10. The transmission system as claimed in claim 9, characterized in that the transport stream as a variable bit rate.

11. The transmission system as claimed in claim 9, characterized in that the transport stream is a partial transport stream.

12. The transmission system as claimed in claim 8, characterized in that the transmission system comprises transport stream jitter compensating means coupled to the jitter compensating means.

13. The transmission system as claimed in claim 12, characterized in that the transport stream jitter compensating means include a Phase Locked Loop (PLL) or a counter.

14. A transmitter suited for application in the transmission system as claimed in claim 8, comprising the transmitter and a receiver mutually coupled through a transmission medium, the transmitter comprising a transmitter wall clock and transmission time stamping means coupled to the transmitter wall clock for time stamping the data packets upon their transmission to the receiver, characterized in that the receiver comprises a receiver wall clock which is similar to the transmitter wall clock, a reception time stamping means coupled to the receiver wall clock for generating time stamps upon reception of the data packets, and jitter compensating means coupled to the reception time stamping means for compensating jitter on the data packets, whereby the transmission time stamp is included in a Program Clock Reference (PCR) packet as a first packet in an isochronous protocol type data packet.

15. A receiver suited for application in the transmission system as claimed in claim 8, comprising a transmitter and the receiver mutually coupled through a transmission medium, the transmitter comprising a transmitter wall clock and transmission time stamping means coupled to the transmitter wall clock for time stamping the data packets upon their transmission to the receiver, characterized in that the receiver comprises a receiver wall clock which is similar to the transmitter wall clock, a reception time stamping means coupled to the receiver wall clock for generating time stamps upon reception of the data packets, and jitter compensating means coupled to the reception time stamping means for compensating jitter on the data packets, whereby the transmission time stamp is included in a Program Clock Reference (PCR) packet as a first packet in an isochronous protocol type data packet.

* * * * *